(12) United States Patent
Thomas et al.

(10) Patent No.: US 10,079,896 B2
(45) Date of Patent: *Sep. 18, 2018

(54) VIRTUAL DESKTOP MIGRATION

(71) Applicant: Amazon Technologies, Inc., Seattle, WA (US)

(72) Inventors: Nathan Bartholomew Thomas, Seattle, WA (US); Eugene Michael Farrell, Sammamish, WA (US); Erik Jonathon Tellvik, Renton, WA (US); Gaurang Pankaj Mehta, Seattle, WA (US); Deepak Suryanarayanan, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/353,628

(22) Filed: Nov. 16, 2016

(65) Prior Publication Data
US 2017/0070581 A1  Mar. 9, 2017

Related U.S. Application Data

(63) Continuation of application No. 14/494,157, filed on Sep. 23, 2014, now Pat. No. 9,537,938.

(51) Int. Cl.
*G06F 15/16* (2006.01)
*H04L 29/08* (2006.01)
(Continued)

(52) U.S. Cl.
CPC ............ *H04L 67/148* (2013.01); *G06F 9/452* (2018.02); *G06F 9/4856* (2013.01); *H04L 43/08* (2013.01);
(Continued)

(58) Field of Classification Search
CPC ......... H04L 29/08; H04L 12/26; H04L 67/10; H04L 67/18; H04L 43/08; G06F 9/455; G06F 9/4856; G06F 9/45558
(Continued)

(56) References Cited

U.S. PATENT DOCUMENTS

| 2013/0073670 A1* | 3/2013 | Das | G06F 9/5027 |
| | | | 709/217 |
| 2013/0219043 A1* | 8/2013 | Steiner | G06F 9/4856 |
| | | | 709/224 |

(Continued)

OTHER PUBLICATIONS

International Search Report and Written Opinion, International Application No. PCT/US2015/051480, Dec. 17, 2015, 15 pages.

(Continued)

*Primary Examiner* — Tauqir Hussain
(74) *Attorney, Agent, or Firm* — Klarquist Sparkman, LLP

(57) ABSTRACT

It may be determined that a cloud desktop should be migrated from a current region. A destination region to which the cloud desktop will be migrated can be identified. A data volume of the cloud desktop may be copied from the current region to the destination region. The data volume at the current region and the data volume at the destination region may be maintained in sync during the copying. Upon completion of the copying, a current user session associated with the cloud desktop at the current region may be frozen, a current memory and processor state of the current user session may be copied to the destination region, and a second cloud desktop instance at the destination region may be started using the copied data volume and current memory and processor state. The current user session may be connected to the second cloud desktop instance.

16 Claims, 10 Drawing Sheets

(51) Int. Cl.
  *H04L 12/26* (2006.01)
  *G06F 9/451* (2018.01)
  *G06F 9/48* (2006.01)
(52) U.S. Cl.
  CPC .............. *H04L 43/16* (2013.01); *H04L 67/10* (2013.01); *H04L 67/1095* (2013.01); *H04L 67/18* (2013.01)
(58) Field of Classification Search
  USPC ........................................................ 709/203
  See application file for complete search history.

(56) References Cited

U.S. PATENT DOCUMENTS

| | | |
|---|---|---|
| 2014/0258115 A1 | 9/2014 | Takahashi et al. |
| 2014/0258333 A1 | 9/2014 | Woodruff |
| 2014/0258533 A1 | 9/2014 | Antony |
| 2015/0222702 A1 | 8/2015 | Salle et al. |

OTHER PUBLICATIONS

International Preliminary Report on Patentability, International Application No. PCT/US2015/051480, 12 pages, dated Apr. 6, 2017.
Notice of Non-Final Rejection, Korean Patent Application No. 2017-7009658, dated Feb. 13, 2018, 6 pages.
First Notification of Office Action, Chinese Application No. 2015800515602, 16 pages, dated Dec. 25, 2017.
Search Report, Chinese Application No. 2015800515602, 2 pages, dated Dec. 25, 2017.
Examination Report No. 1, Australian Application No. 2015321468, 4 pages, dated Nov. 21, 2017.
Office Action, Canadian Application No. 2,959,959, 3 pages, dated Jan. 8, 2018.
First Office Action, Japanese Patent Application No. 2017-514480, 3 pages, dated May 8, 2018.
Examination Report No. 2, Australian Application No. 2015321468, 4 pages, dated Jul. 23, 2018.

* cited by examiner

VIRTUAL DESKTOP MIGRATION

CROSS REFERENCE TO RELATED APPLICATIONS

This is a continuation of U.S. patent application Ser. No. 14/494,157, filed Sep. 23, 2014, which is incorporated by reference herein.

BACKGROUND

Cloud computing is the use of computing resources (hardware and software) that are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or the ability to adapt rapidly to changing computing resource needs.

A virtual desktop environment may be hosted on the cloud or on a server at an organization site. A desktop computing environment on the cloud (hereinafter referred to as a "cloud desktop") provides a virtual desktop environment running on servers in the cloud that a user can connect to from a personal computing device. A desktop computing environment at an organization site (hereinafter referred to as an "on-premise virtual desktop") provides a virtual desktop environment running on servers owned and/or operated by the organization or user associated with the organization. Many virtual desktops provide constant availability, where a virtual desktop instance continually runs on one or more servers in the cloud or on one or more organization servers. However, virtual desktops are heavily sensitive to network latency, since they must stream a real-time user interactive desktop session over the network from a server (e.g., running in the cloud) to a user device. If a cloud virtual session has high latency, a user may experience delay when they, e.g., move their mouse or attempt to stream audio, diminishing the user experience. In addition, network latency may increase with the geographic distance between the user device and the virtual desktop environment.

DETAILED DESCRIPTION

Overview

Figure 1:
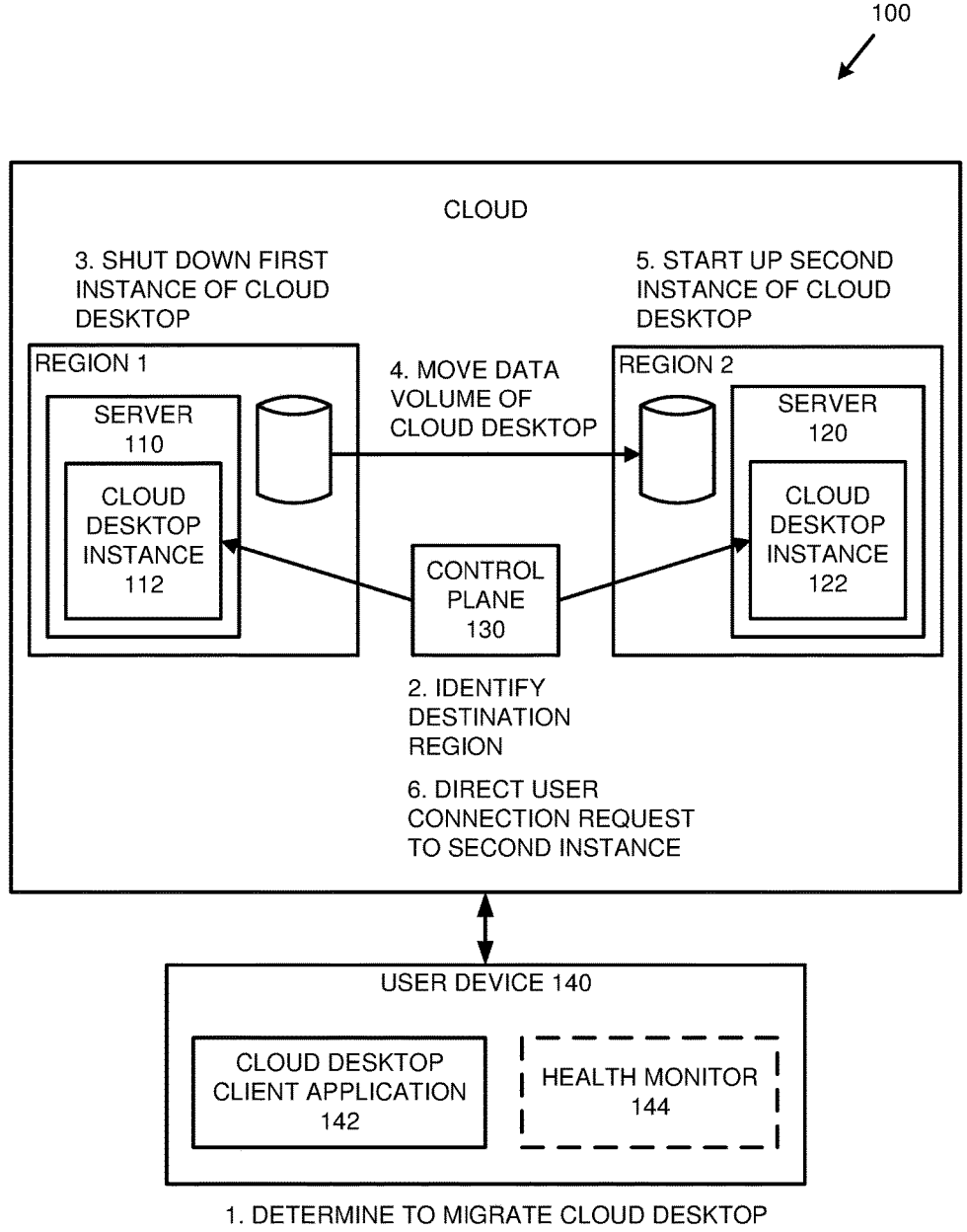
FIG. 1 is a computing system diagram of a cloud desktop environment.

The following description is directed to techniques and solutions for migrating a virtual desktop (e.g., a cloud desktop and/or another type of virtual desktop) between locations (e.g., regions) to improve performance (e.g., reduce network latency, increase bandwidth, etc.). For example, migrating a user's cloud desktop instance from one region to another region based on geographic location or network latency can provide a more pleasing user experience since the cloud desktop may become more responsive. As used herein, the term "user device" refers to any type of computing device (e.g., a server computer, desktop computer, laptop, tablet, mobile phone, or another type of computing device) that is capable of hosting a cloud desktop session.

Cloud desktops may run on servers in the cloud. For example, a cloud desktop instance may run on the cloud, where a cloud desktop session captures the user's interaction on a user device and applies the interactions on a desktop instance running at a different location on the cloud. However, this interaction may be heavily sensitive to network latency, bandwidth, jitter (e.g., variation in network packet round-trip times), and/or other performance measurements. If the cloud desktop session has high latency, the user may experience lag or jagged movements on the display of the user device. Network latency often increases with geographic distance between the user device and the server in the cloud. In order to reduce network latency, the server component for a cloud desktop may be migrated from a region that exhibits high latency to the user device to one that exhibits lower latency to the user device. In any of the examples hereinafter, the terms "data center" and "region" may be used interchangeably. A data center may refer to the physical location hosting the server components for a cloud desktop. Each data center may be located in a region. However, a one-to-one relationship in not necessary between data centers and regions. For example, a region may house more than one data center. A geographic region may refer to an area encompassing a distance originating from a user device. A geographic region may also refer to a city, county, location name, or any other designation where a user may be located and/or a data center may be hosted.

In a particular embodiment, it may be determined that a cloud desktop should be migrated from a current region based on at least one of network latency of a user computing device to the current region and geographical location of the user computing device relative to the current region. A destination region to which the cloud desktop will be migrated can be identified based on at least one of network latency of a user computing device to the destination region and geographical location of the user computing device relative to the destination region. A first instance of the cloud desktop running at the current region can be shut down and a data volume of the cloud desktop comprising user data associated with a user of the cloud desktop can be moved from the current region to the destination region. Then, a second instance of the cloud desktop at the destination region can be started up using the moved data volume. Upon receiving a user connection request, the user can be directed to the second instance of the cloud desktop at the destination region.

In another embodiment, a computing environment may be provided for migrating a cloud desktop between data centers. The computing environment may include a control plane layer that tracks a data volume of the cloud desktop and one or more data centers, a current data center that contains the cloud desktop and the data volume; one or more candidate data centers; and a management component. The management component may be used to determine that a cloud desktop should be migrated from the current data center based on at least one of network latency of a user computing device to the current data center and geographical location of the user computing device relative to the current data center and identify one of the candidate data center to migrate the cloud desktop based on at least one of network latency of the user computing device to the destination data center and geographical location of the user computing device relative to the destination data center. The data volume of the cloud desktop can be moved from the current data center to the identified candidate data center. Then, upon receiving a user connection request, the user can be directed to the instance of the cloud desktop at the identified candidate data center.

In another embodiment, it may be determined that a cloud desktop should be migrated from a current region. A destination region to which the cloud desktop is to be migrated can be identified. A data volume of the cloud desktop can be copied from the current region to the destination region while the data volume at the current region and the data volume at the destination region are maintained in sync. Upon completion of the copying, a current user session associated with the cloud desktop can be frozen at the current region and a current memory and processor state of the current user session can be copied to the destination region. Then, a second cloud desktop instance can be started using the data volume and the current memory and processor state at the destination region and the current user session can be reconnected to the second cloud desktop instance.

Thus, the cloud desktop can be moved to another region so that the performance of the cloud desktop is improved. It should also be appreciated that the cloud desktop can be moved to another region for reasons other than improving the performance of the cloud desktop. For example, the cloud desktop may be moved to another region as part of a disaster recovery process. If there is an outage of a data center (or an anticipated outage of a data center), the cloud desktop may be moved proactively or reactively. Thus, the user need not be aware that their cloud desktop has been moved due to a data center outage. The aforementioned scenarios are not the only scenarios under which a cloud desktop is migrated and other scenarios may also exist to migrate a cloud desktop. For example, server maintenance may require a cloud desktop to be migrated.

Cloud Desktop

FIG. 1 is a computing system diagram of a cloud desktop environment 100. A user may launch a cloud desktop session via, e.g., a cloud desktop client application 142 running on a user device 140. The cloud desktop client application 142 may connect the user device 140 to a cloud desktop instance 112 running on a server 110 at a region. The cloud desktop client application 142 can mimic the appearance of an operating system environment so that it appears to the user that the user device 140 is running the cloud desktop instance 112 locally on the user device 140. The user device 140 may also include a health monitor 144. The health monitor 144 monitors the network connection between the user device 40 and the cloud desktop instance 112. Although the health monitor 144 is depicted as being separate from the cloud desktop client application 142, the health monitor 144 may instead be a part cloud desktop client application 142. Also, the health monitor 144 is depicted as being located on the user device 140. However, the health monitor may instead be located in the cloud desktop environment 100. For example, a health monitor server may exist in the cloud desktop environment 100. Furthermore, the health monitor may exist on one or more of the servers hosting the cloud desktop instances.

In the previous example, a cloud desktop client application is described. However, a cloud desktop client application need not necessarily be used. In some embodiments, the cloud desktop instance may be viewed on a web browser, the browser displaying the contents of the cloud desktop.

A control plane 130 identifies the location of the region that the cloud desktop instance 112 is running. For example, the cloud desktop client application 142 may connect to the cloud desktop through a single access point (e.g., a connection manager (not shown)). The control plane 130 points to the cloud desktop instance 112 running at a server 110. Thus, when the user connects to the cloud desktop, the control plane 130 points to the region where the cloud desktop instance 112 is located. The control plane 130 also has information on other regions to which a connection may be made. Thus, if a user changes regions (or if the change is performed automatically), the control plane 130 will point to the cloud desktop instance running at the new region. Although, FIG. 1 displays two regions, the depiction is for illustrative purposes, and many more regions exist. Also, depicted is a single server for each region, where many servers may exists in a region. In addition, although the control plane 130 is depicted as separate from the cloud desktop servers, it may also be located on more or more of the servers.

The cloud desktop instance is hosted on a server 110 in a region. The server 110 provides an instance of the user's cloud desktop. The server 110 receives the input from the user device 140 and operates on the cloud desktop instance 112, translating the inputs on the user device 140 to inputs to the cloud desktop instance 112. For example, if the user clicks on an icon on the cloud desktop session running on the user device 140, the corresponding application on the server 110 will be executed in the cloud desktop instance 112. The cloud desktop instance 112 may include a virtual machine that is instantiated to provide a user with access to a computing resource, or compute node, such as a virtual desktop. Alternatively, the cloud desktop instance 112 may be created on the server 110 without use of a virtual machine.

The cloud desktop instance 112 may include a desktop environment. The desktop environment may include any type of environment representing a virtual desktop. For example, the desktop environment can include an interface for interacting with files and/or applications that are stored in the cloud desktop. In some cases, the desktop environment may include shortcuts for accessing data and/or applications that are included or hosted by another instance. Further, in some cases, the desktop environment can provide additional or alternative interfaces for accessing files and applications besides a desktop. For example, the desktop environment can include or be a file manager. In some cases, regardless of the underlying operating system and/or hardware, the desktop environment may present a particular look and feel. For example, the desktop environment can be configured to emulate a Windows desktop, a Linux desktop, or an iOS desktop. In other cases, the instance may be part of a virtual machine computing resource selected by a user. In such cases, the desktop environment may be the desktop environment of the selected operating system for the virtual machine computing resource (e.g., Windows, Linux, etc.).

In the previous example, a single server 110 running the cloud desktop in the region is described. It can be appreciated, however, that multiple servers can be used for the cloud desktop. For example, a separate server may contain a data volume for the desktop.

If a user would like to access their cloud desktop from a different region, a data volume for the user's cloud desktop may be moved from the previous region to a server 120 at the new region and a new cloud desktop instance 122 may be started.

For example, the user may decide to move their cloud desktop to another region based on various factors. For example, if a user resides in one geographic region (i.e., the data center for that geographic region hosts the cloud desktop instance), but will be located in a different geographic region for a period of time, the user may decide to move their cloud desktop to the new geographic region. The location may be determined by, e.g., the IP address of the user device. Alternatively, the cloud desktop application may alert the user (e.g., via the health monitor 144 or a network monitor) that their network health is bad or their latency can be improved if the user migrates their cloud desktop to another region. This alert may occur at the beginning of a cloud desktop session, at certain times during the cloud desktop session, at the user's direction (e.g., the user opens an application to test their network speed), or at regular intervals throughout the cloud desktop session.

In the previous example, a cloud desktop session is described. It should be understood that a cloud desktop session may refer to a session where a connection to a first instance is redirected to a second instance without disconnecting a user (e.g., the user is logged into a single session). The cloud desktop session may also refer to a session where a connection to a first instance is dropped and a second connection to a second instance is started (e.g., the user may be given an indication that their session is reconnecting). The cloud desktop session is not limited to the previous descriptions and may be any session that enables a connection from a user device to a first instance at one region and a second instance at another region.

Geographic Region and Latency

A data center is located in a geographic region. For example, a single region (e.g., Portland, Oreg.) may host a data center (e.g., Portland data center). Another region (e.g., Miami, Fla.) may host a different data center (e.g., Miami data center). A user's cloud desktop may be hosted in any one of the data centers. A user wishing to connect to their cloud desktop (i.e., cloud desktop instance) may access the data center containing their cloud desktop instance through their user device. The data center containing the user's cloud desktop instance may be the data center initially set up for user's cloud desktop. However, if the user changes location (e.g., the user wants to work from Miami), the user's initial data center may be geographically distant (e.g., the cloud desktop is hosted in the Portland data center) and/or the user's cloud desktop session may suffer from high latency. Thus, it may be desirable to locate the cloud desktop to a data center closer to the user. For example, the network latency for a user computing device to the current region can be calculated, and a latency threshold can be used to determine if the cloud desktop should be moved.

Furthermore, latency may increase for reasons other than the distance of the data center relative to the user device. Depending on how a user is connecting to a data center (via a network), the latency may increase depending on the connection. For example, if a user attempts to connect to a data center and the network topology from the user device to the data center is long or travels over a slow connection, the latency will likely be high. Thus, decreasing the geographic distance between the user device and a destination data center may improve the network latency. However, this may not always be the case. For example, if a data center is geographically close to the user device but the connection to the data center from the user device is slow, the user may experience better performance by connecting to a data center geographically father away, but with a faster connection between the data center and the user device.

In some embodiments, the destination region may be selected, not based on network latency, but on other criteria. For example, if a country has rules and regulations regarding the storage of data, the destination region may be selected based on those rules and regulations. Furthermore, if the cost of storage differs between data centers, a user may select the destination region based on the charge structure. The selection of geographic region is not limited to the above, and any number of factors may be used to determine a destination region. For example, if there is historical latency data for a geographical location, the destination region may be determined based on that historical latency data.

Migrating a Cloud Desktop

Figure 2:
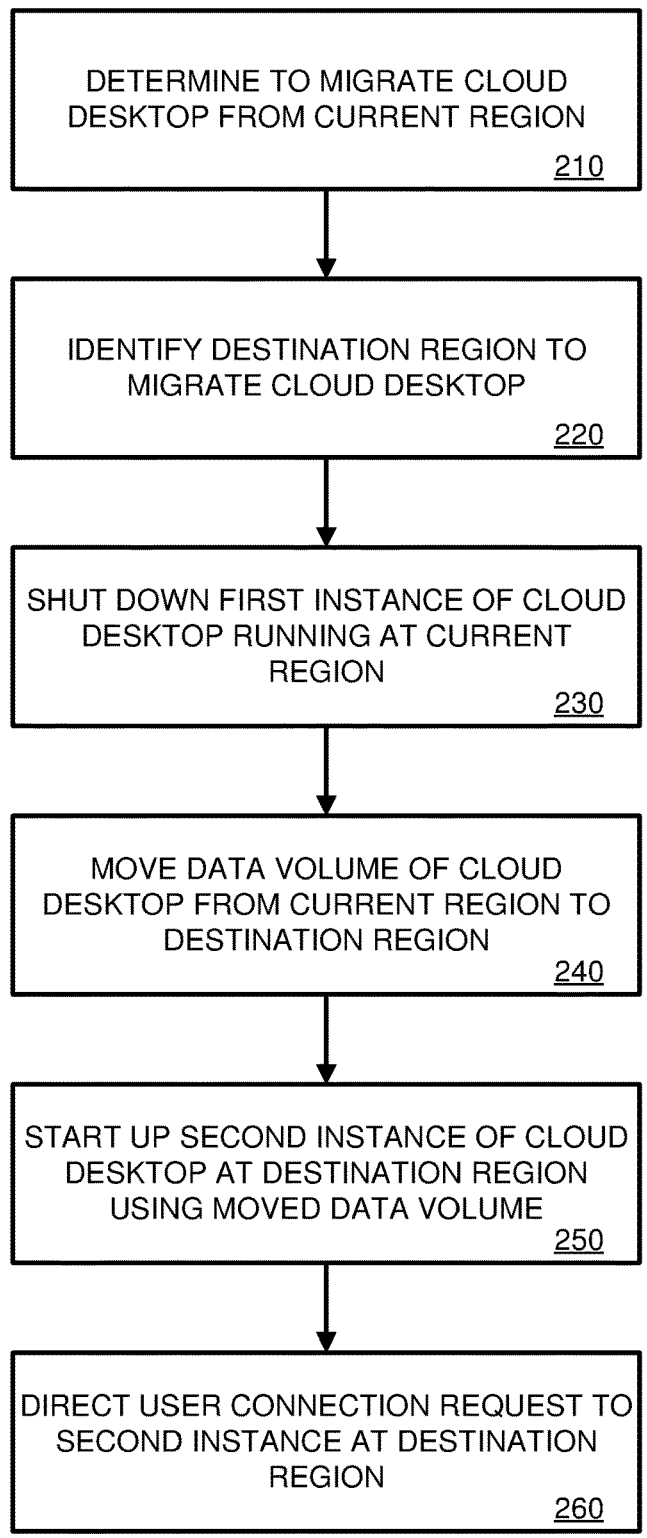
FIG. 2 is a flowchart showing an example method of migrating a desktop.

FIG. 2 is a flowchart showing an example method of migrating a virtual desktop (e.g., a cloud desktop or another type of virtual desktop such as an on-premise virtual desktop). At 210, a determination is made to migrate a cloud desktop from a current region based on at least one of network latency of a user computing device to the current region and geographical location of the user computing device relative to the current region. For example, a user may receive an indication that the network health is bad (e.g., high latency or reliability of the connection). Thus, the cloud desktop session may recommend that the user move the cloud desktop volume to a different region. The user may be prompted to migrate their cloud desktop, and based on the user's selection, a determination to migrate the cloud desktop may be made. The determination may occur at the beginning of the user's cloud desktop session, upon request by the user, or the status of the network may be continuously monitored. In addition an administrator associated with the cloud desktop may also be prompted to move a user's cloud desktop (e.g., if the administrator receives an indication that the network latency has exceeded a threshold), and the administrator may determine to migrate the cloud desktop to a different region.

At 220, a destination region to which to migrate the cloud desktop is identified based on at least one of network latency of the user computing device to the destination region and geographical location of the user computing device relative to the destination region. The user may be provided a list of data centers that are geographically close to the user. Alternatively, the cloud desktop may ping a number of data centers and use the time signature of the received packets to determine the destination region. The destination region may be identified by the user or the destination may be determined automatically. For example, once it is determined that the cloud desktop should be migrated, a destination region may be identified without input from the user. There may be more than one candidate region. Based on, e.g., network latency of the user device to the one or more candidate regions and geographical location of the user computing device relative to the one or more candidate regions, the candidate regions can be evaluated to determine the destination region.

At 230, a current instance (i.e., first instance) of the cloud desktop running at the current region is shut down. Since the cloud desktop volume is to be moved, in order to ensure that the volume is not changed during the migration (i.e., from a user making changes on the cloud desktop), the cloud desktop session may be suspended. For example, the session may display a progress bar or some other indication that the cloud desktop is being moved or is otherwise currently unavailable.

At 240, a data volume of the cloud desktop is moved from the current region to the destination region. The data volume may include user data associated with a user of the cloud desktop, application data, application software, operating system software, or anything else needed to move the cloud desktop to the destination region.

At 250, a new instance (i.e., second instance) of the cloud desktop is started up at the destination region using the moved data volume. The second instance may be recreated from an operating system image, the user's cloud desktop instance from the current region, the moved data volume, and/or any other software or setting used to for the second instance of the cloud desktop.

At 260, upon receiving a user connection request, the user connection request is directed to the second instance of the cloud desktop at the destination region. The user may receive an indication that their cloud desktop has been moved or the cloud desktop may be moved without notice to the user. In addition, the user need not be aware of where the cloud desktop has been moved to. For example, the user may receive an indication indicated that their cloud desktop was moved.

Figure 3:
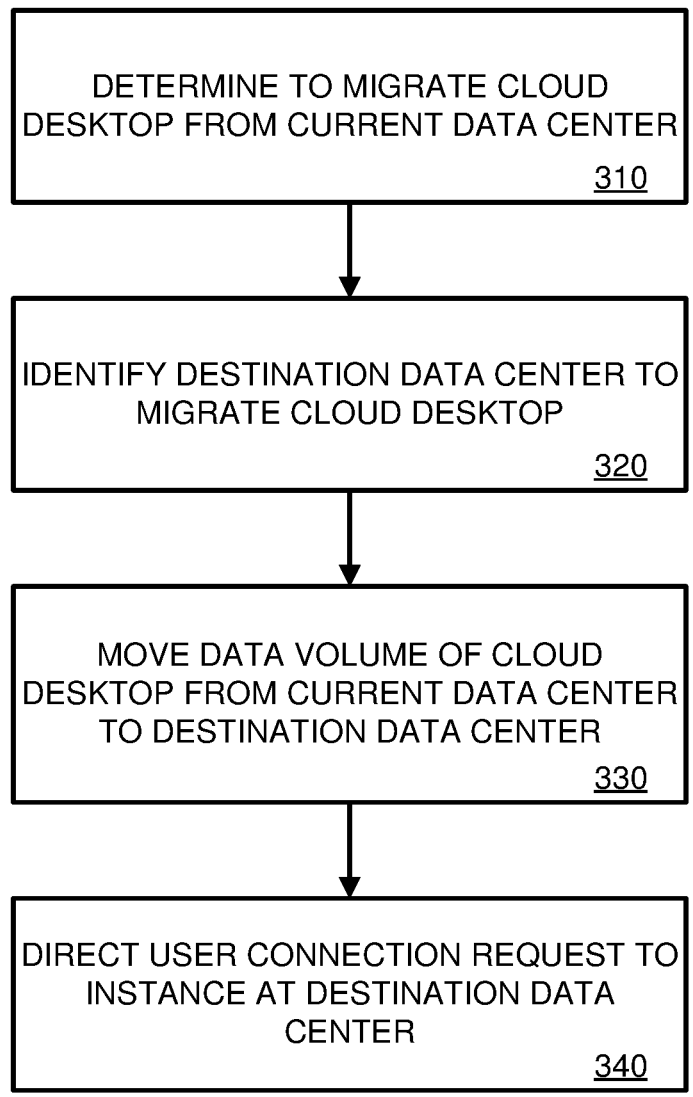
FIG. 3 is a flowchart showing another example method of migrating a desktop.

FIG. 3 is a flowchart showing another example method of migrating a virtual desktop (e.g., a cloud desktop or another type of virtual desktop such as an on-premise virtual desktop). At 310, a determination is made to migrate a cloud desktop from a current data center based on at least one of network latency of a user computing device to the current data center and geographical location of the user computing device relative to the current data center. The determination may occur at the beginning of the user's cloud desktop session, upon request by the user, or the status of the network may be continuously monitored.

At 320, one of the candidate data centers to which to migrate the cloud desktop is identified as the destination data center based on at least one of network latency of the user computing device to the destination data center and geographical location of the user computing device relative to the destination data center. The user may be provided a list of candidate data centers that are geographically close to the user. Alternatively, the cloud desktop may ping a number of candidate data centers, and select the data center where the network latency of the user computing device to the destination data center is less than a latency of the user computing device to the current data center.

At 330, a data volume of the cloud desktop is moved from the current data center to the destination data center. At 340, upon receiving a user connection request, the user connection request is directed to the instance of the cloud desktop running at the destination data center. A management component may be used in the performance of any of the aforementioned steps.

Figure 4:
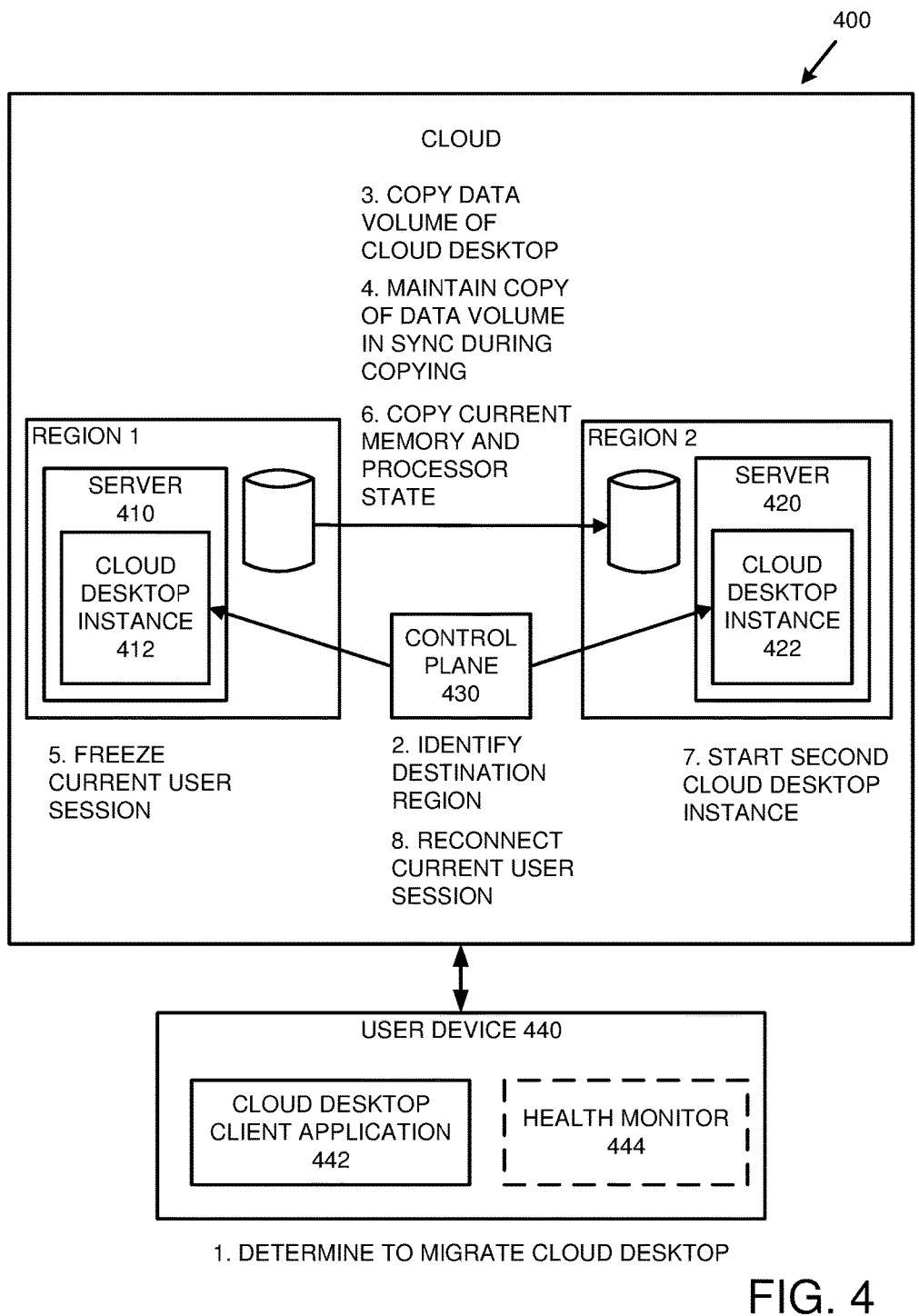
FIG. 4 is another computing system diagram of the cloud desktop environment.
Figure 5:
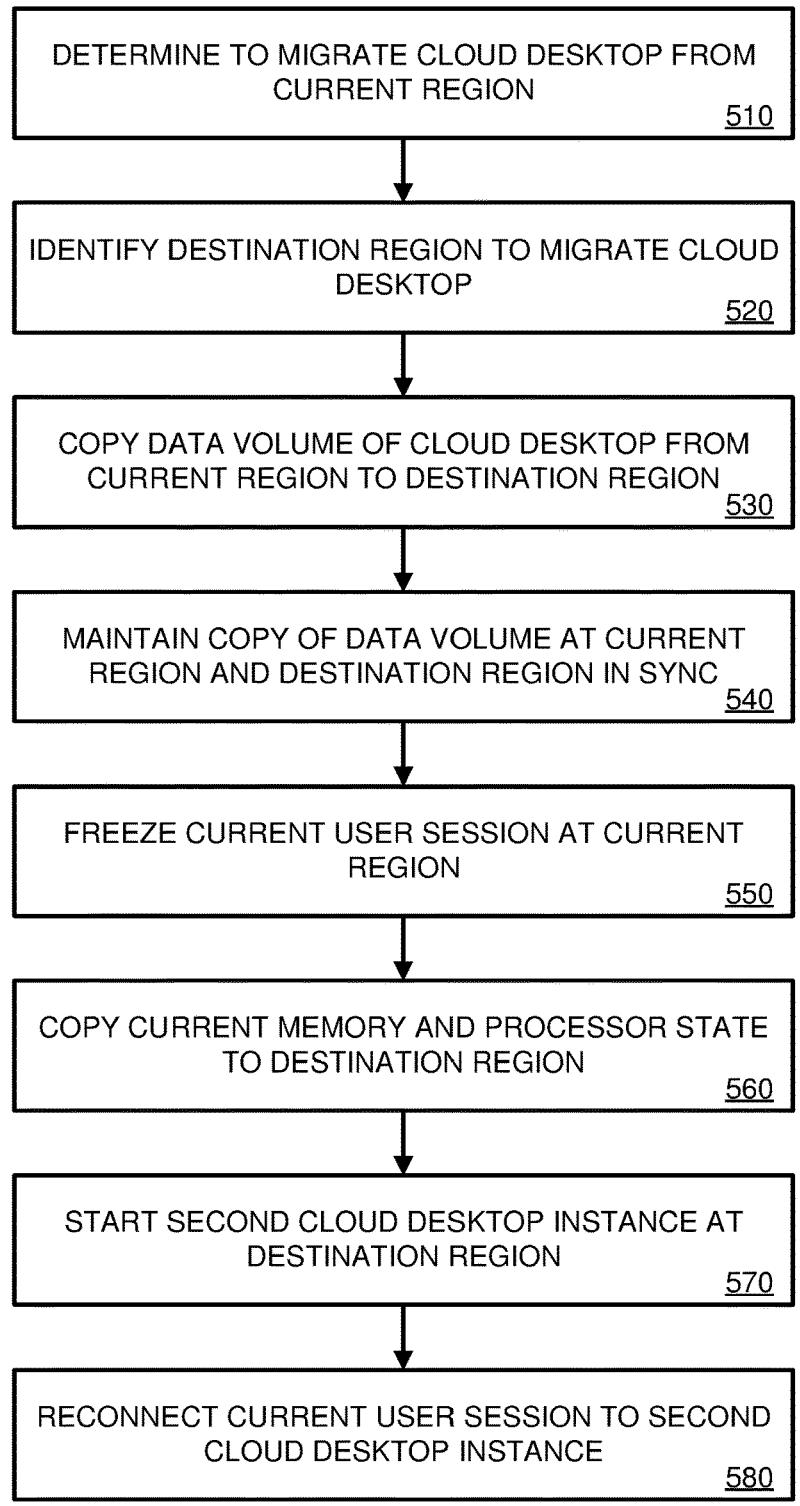
FIG. 5 is a flowchart showing another example method of migrating a desktop.

FIG. 4 is a computing system diagram of a cloud desktop environment 400, and FIG. 5 is a flowchart showing an example method of migrating a desktop. A user may launch a cloud desktop session via, e.g., a cloud desktop client application 442 running on a user device 440. The cloud desktop client application 442 may connect the user device 440 to a cloud desktop instance 412 running on a server 410 at a region.

At 510, a determination is made to migrate a cloud desktop from a current region. The determination may occur at the beginning of the user's cloud desktop session, upon request by the user, or the status of the network may be continuously monitored. The determination made be performed by a health monitor 444 on the user device 440. A control plane 430 identifies the location of the region that the cloud desktop instance 412 is running.

At 520, a destination region to which to migrate the cloud desktop is identified. The user may be provided a list of data centers that are geographically close to the user. Alternatively, the cloud desktop may ping a number of data centers and use the time signature of the received packets to determine the destination region.

At 530, a data volume of the cloud desktop is copied from the current region to the destination region. The data volume may include user data, application data, application software, operating system software, or anything else needed to move the cloud desktop to the destination region. At 540, the data volume of the cloud desktop at the current region and the data volume of the cloud desktop at the destination region are maintained in sync during the copying. For example, if the data volume was changed, e.g., due to the user saving a new document, the changes to the data volume will be copied ensuring that the data volume at the current region and the data volume at the destination region appear the same.

At 550, when the copying is complete, the current user session associated with the cloud desktop at the current region is frozen (e.g., the current user session is locked or suspended until it can be reconnected to the new instance). This ensures that no new changes can be made at the current region, causing the data volume at the current region and the data volume at the destination region to become out of sync. Although the current example describes freezing the current user session, the current user session need not be frozen. For example, changes at the current region may be recorded and moved up until, e.g., the user is switched to the instance running at the destination region.

At 560, the current memory and processor state at the current region are copied to the destination region. At 570, a second cloud desktop instance 422 on the server 420 at the destination region is started using the copied data volume and current memory and processor state. This allows the second cloud desktop instance 422 to appear substantially the same as the cloud desktop instance 412 that was running at the current region. For example, any application that was running at the cloud desktop instance 412 at the current region prior to the copying of the data volume will be running on the second cloud desktop instance 422.

At 580, the current user session is reconnected to the second cloud desktop instance 422. Since the appearance of the cloud desktop instance at the current region and the second cloud desktop instance appear the same (i.e., the desktop appearance is the same), the user may not even be aware that the cloud desktop was moved to the destination region.

In the descriptions above, the terms "move" and "copy" are used interchangeably. Due to the nature of a copy and/or move operation, it should be understood that a copy may remain on a source device until the copy/move operation is complete. As well understood in the art, this allows for data persistence in the case of a lost connection, shutdown of a device, etc.

Thus, since the cloud desktop instance is running at a destination region that is geographically closer or that has a lower latency respective to the client device, the user should experience better performance when using the cloud desktop.

Cloud Computing Environment

Figure 6:
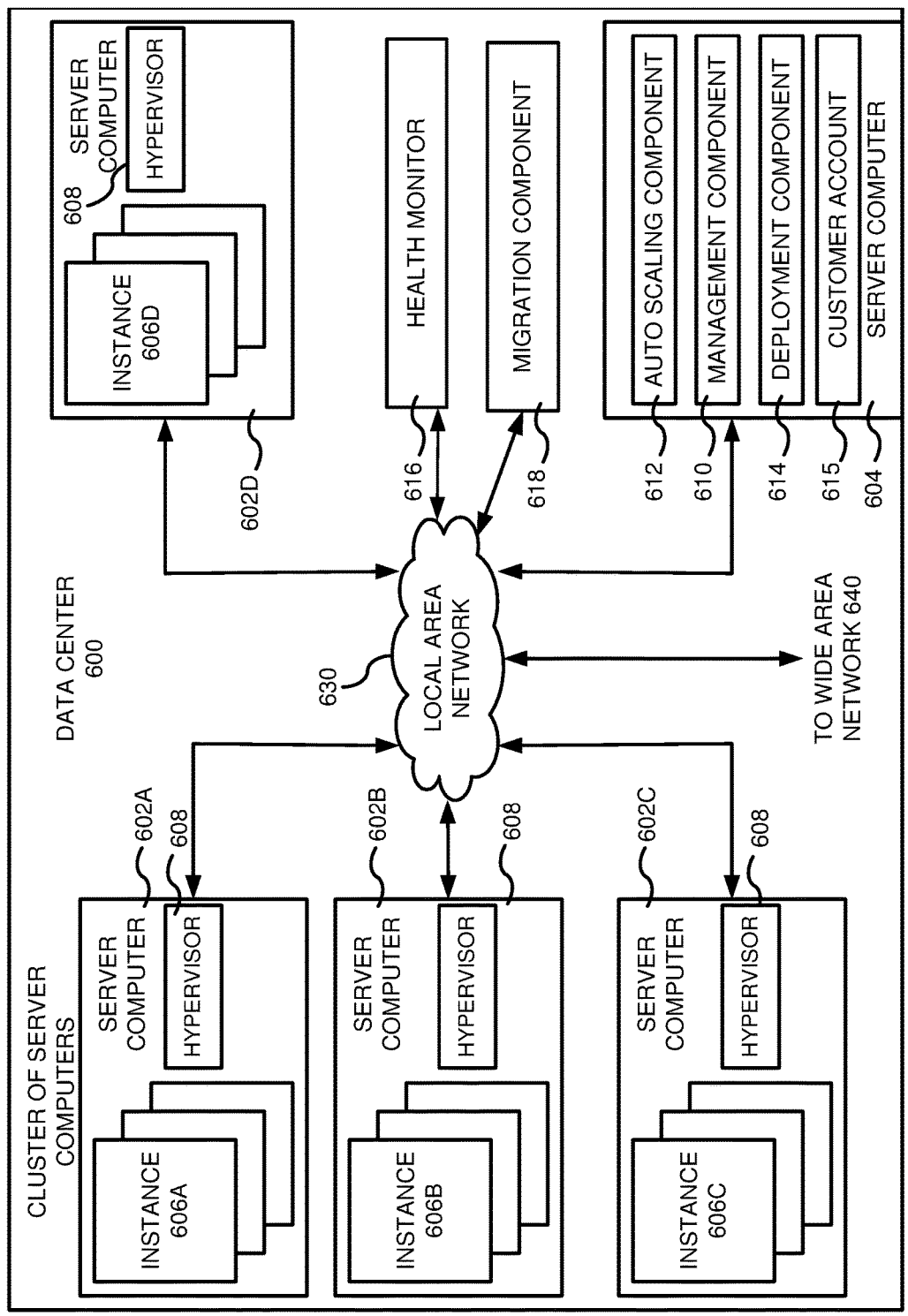
FIG. 6 is an example system diagram showing a plurality of virtual machine instances running in the multi-tenant environment.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example of virtual machine, each of the servers 602A-602D can be configured to execute a hypervisor 608 or another type of program configured to enable the execution of multiple instances 606 on a single server. Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A health monitor 616 may keep track of the health (e.g., network latency) of a user device to the server computers 602. For example, if the health monitor 616 determines that the health is bad (e.g., the network latency is high), the health monitor 616 may alert the user.

A migration component 618 may be used to migrate data volumes from one data center to another. The migration component 618 may have its own data store with connection and location information. For example, the connection and location information may be used to identify a destination region. In FIG. 6, the health monitor 616 and migration component 618 are depicted as separate components. It should be understood that the health monitor 616 and/or migration component 618 may also be a part of another component (e.g., the management component 610). Furthermore, the management component may also include a cloud desktop management component to manage the cloud desktops. The cloud desktop management component may also be used to migrate a cloud desktop.

A network 630 can be utilized to interconnect the server computers 602A-602D and the server computer 604. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and networking devices can be utilized to interconnect the various computing systems disclosed herein.

Figure 7:
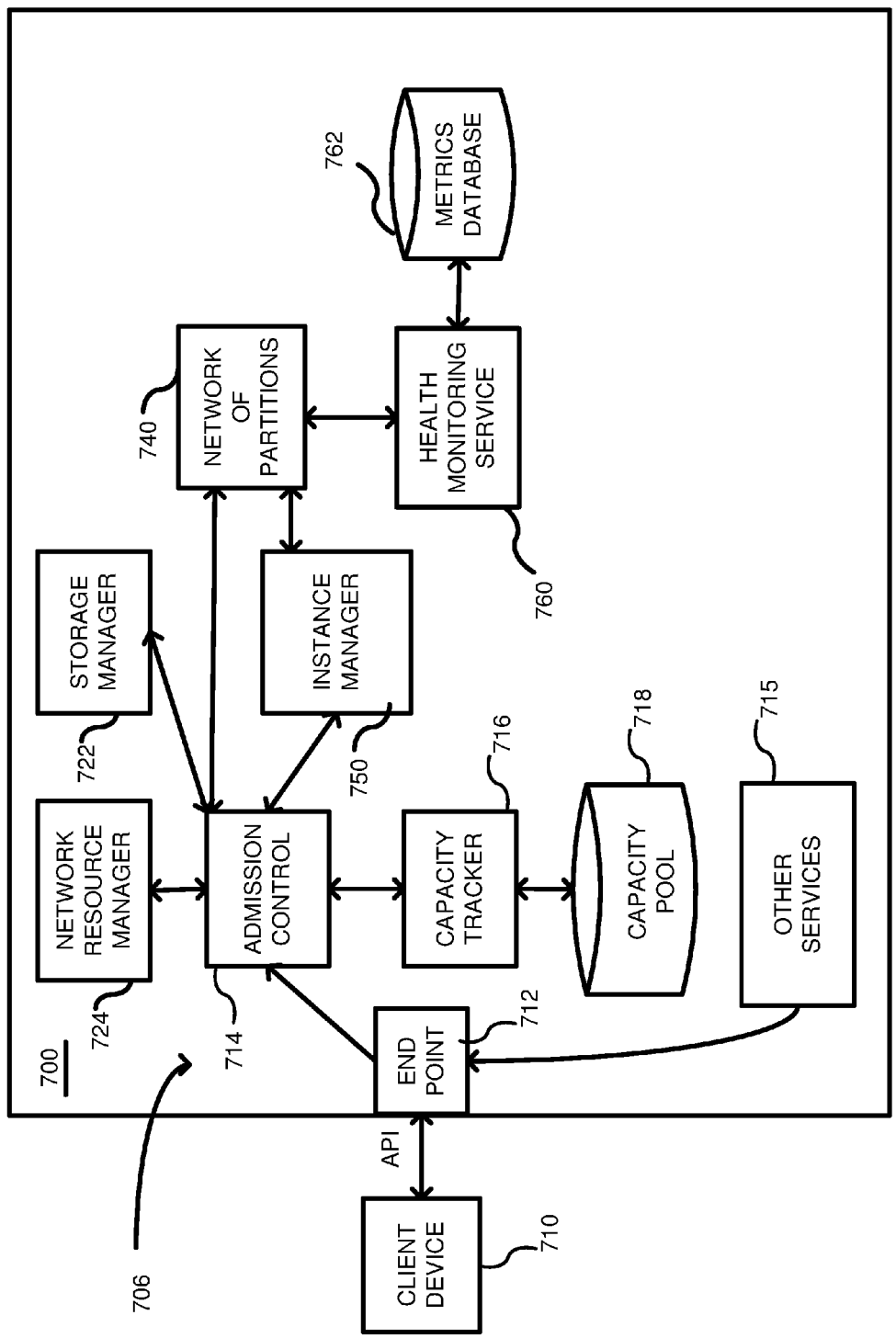
FIG. 7 shows further details of an example system including a plurality of management components associated with a control plane.

FIG. 7 illustrates in further detail management components 706 that can be used in the multi-tenant environment of the compute service provider 600. In order to access and utilize instances (such as instances 606 of FIG. 6), a client device can be used. The client device 710 can be any of a variety of computing devices, mobile or otherwise including a cell phone, smartphone, handheld computer, Personal Digital Assistant (PDA), desktop computer, etc. The client device 710 can communicate with the compute service provider 600 through an end point 712, which can be a DNS address designed to receive and process API requests. In particular, the end point 712 can be a web server configured to expose an API. Using the API requests, a client 710 can make requests to implement any of the functionality described herein. Other services 715, which can be internal to the compute service provider 600, can likewise make API requests to the end point 712.

Other general management services that may or may not be included in the compute service provider 600 include an admission control 714, e.g., one or more computers operating together as an admission control web service. The admission control 714 can authenticate, validate and unpack the API requests for service or storage of data within the compute service provider 600. The capacity tracker 716 is responsible for determining how the servers need to be configured in order to meet the need for the different instance types by managing and configuring physical inventory in terms of forecasting, provisioning and real-time configuration and allocation of capacity. The capacity tracker 716 maintains a pool of available inventory in a capacity pool database 718. The capacity tracker 716 can also monitor capacity levels so as to know whether resources are readily available or limited. An instance manager 750 controls launching and termination of instances in the network. When an instruction is received (such as through an API request) to launch an instance, the instance manager pulls resources from the capacity pool 718 and launches the instance on a decided upon host server computer. Similar to the instance manager are the storage manager 722 and the network resource manager 724. The storage manager 722 relates to initiation and termination of storage volumes, while the network resource manager 724 relates to initiation and termination of routers, switches, subnets, etc. A network of partitions 740 is described further in relation to FIG. 6 and includes a physical layer upon which the instances are launched.

A health monitoring service 760 can provide monitoring for resources and the applications customers run on the compute service provider 600. System administrators can use the health monitoring service 760 to collect and track metrics, and gain insight to how applications are running. For example, the health monitoring service 760 can allow system-wide visibility into application performance and operational health. Metrics generated by the health monitoring service 760 can be stored in the metrics database 762.

Figure 8:
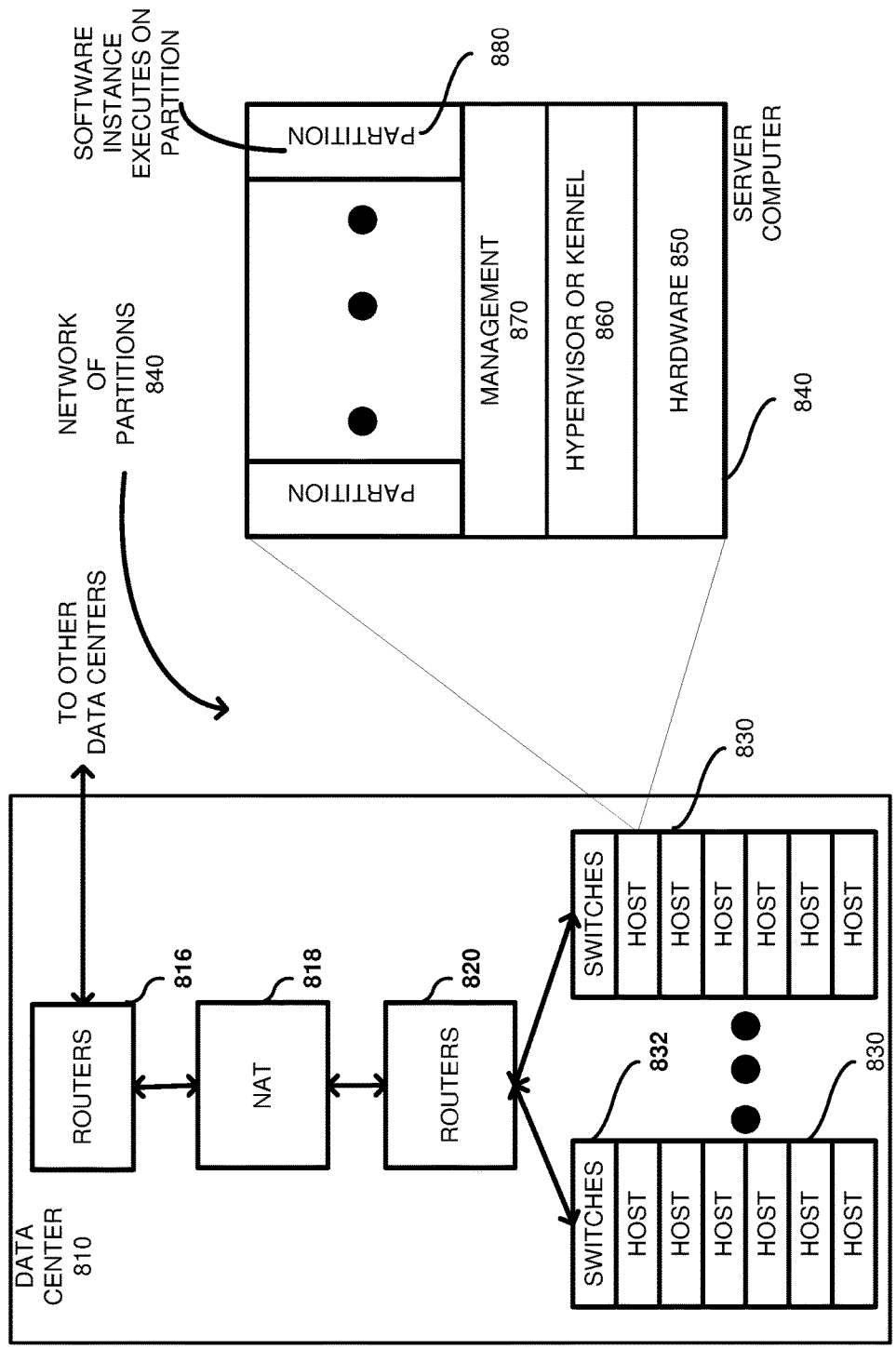
FIG. 8 shows an example of a plurality of host computers, routers and switches, which are hardware assets used for running virtual machine instances.

FIG. 8 illustrates the network of partitions 840 and the physical hardware associated therewith. The network of partitions 840 can include a plurality of data centers, such as data center 810, coupled together by routers 816. The routers 816 read address information in a received packet and determine the packet's destination. If the router decides that a different data center contains a host server computer, then the packet is forwarded to that data center. If the packet is addressed to a host in the data center 810, then it is passed to a network address translator (NAT) 818 that converts the packet's public IP address to a private IP address. The NAT also translates private addresses to public addresses that are bound outside of the datacenter 810. Additional routers 820 can be coupled to the NAT to route packets to one or more racks of host server computers 830. Each rack 830 can include a switch 832 coupled to multiple host server computers. A particular host server computer is shown in an expanded view at 840.

Each host 840 has underlying hardware 850 including one or more CPUs, memory, storage devices, etc. Running a layer above the hardware 850 is a hypervisor or kernel layer 860. The hypervisor or kernel layer can be classified as a type 1 or type 2 hypervisor. A type 1 hypervisor runs directly on the host hardware 850 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 870 can be part of the hypervisor or separated therefrom and generally includes device drivers needed for accessing the hardware 850. The partitions 880 are logical units of isolation by the hypervisor. Each partition 880 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

Any applications executing on the instances can be monitored using the management layer 870, which can then pass the metrics to the health monitoring service 760 for storage in the metrics database 762. Additionally, the management layer 870 can pass to the health monitoring service 760 the number of instances that are running, when they were launched, the operating system being used, the applications being run, etc. All such metrics can be used for consumption by the health monitoring service 760 and stored in the metrics database 762.

Cloud Desktop Environment

Figure 9:
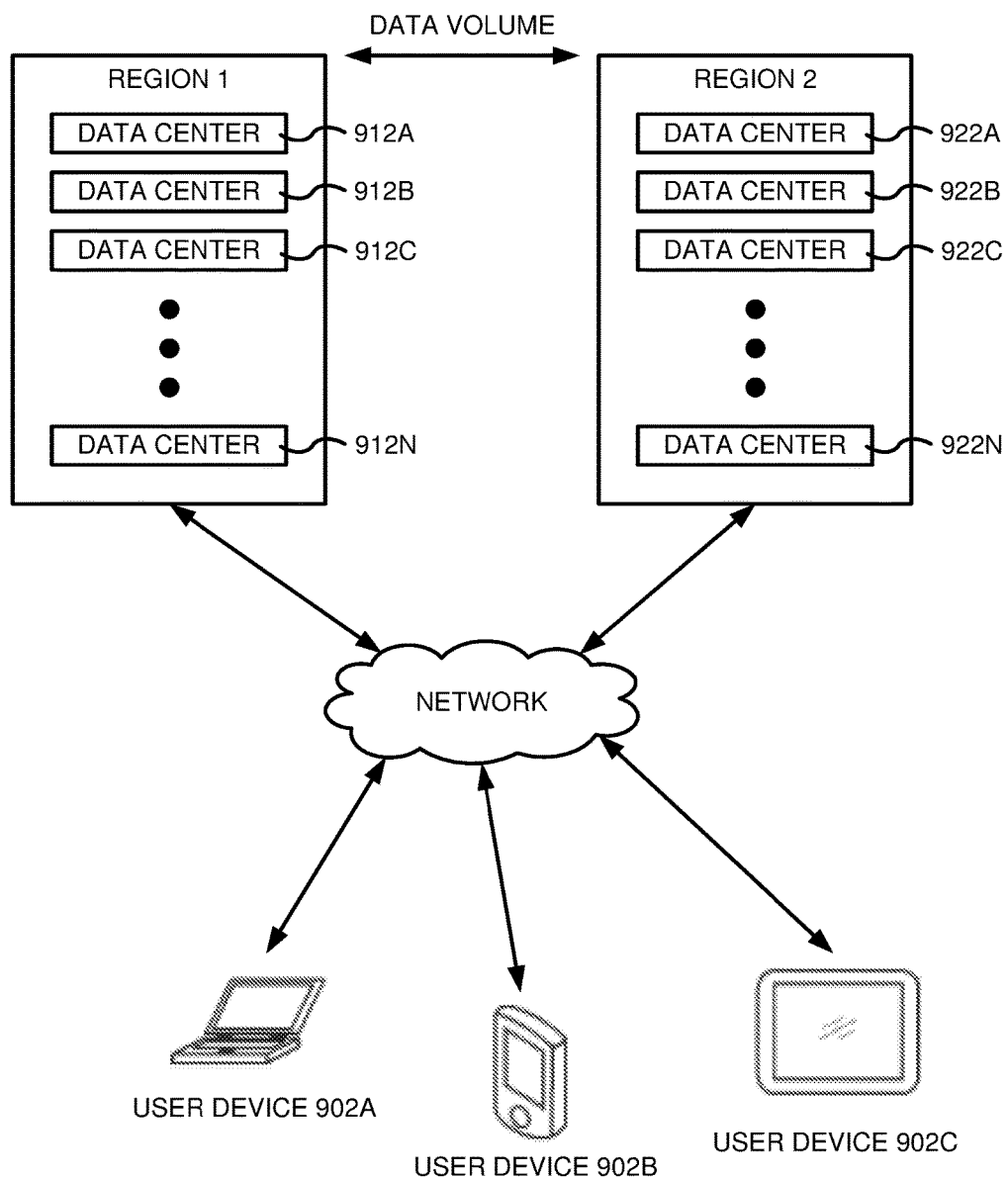
FIG. 9 is a diagram of a cloud desktop environment that can provide cloud desktop resources to various user devices.

FIG. 9 is a diagram of a cloud desktop environment that can provide cloud desktop resources to various user devices. The cloud desktop environment is not intended to suggest any limitation as to scope of use or functionality, as the innovations may be implemented in any type of computing device. For example, a computing can be any of a variety of computing devices (e.g., a server computer, desktop computer, laptop, tablet, mobile phone, or another type of computing device).

With reference to FIG. 9, the cloud desktop environment may include one or more user devices 902A, 902B, 902C. Each of the user devices 902A, 902B, and 902C may be in the same region or different regions. For example, a user device 902A may be used by a user in one region (e.g., office), and user devices 902B and 902C may be used by the user in a different region (e.g., on a business trip). The user may normally access their cloud desktop located on a region (i.e., region 1). The region may contain one or more data centers 912A-912N that host the cloud desktop associated with the user.

If it is determined that the user is in a different geographic location (e.g., the user attempts to access their cloud desktop via user computing device 902B or 902C at a different geographic location), then the user's cloud desktop session can be moved to a different region (e.g., from region 1 to region 2). As another example, it may be determined that the user's cloud desktop session performance would improve if the cloud desktop instance was moved to a different region (i.e., from region 1 to region 2). Thus, a data volume associated with the user is moved from region 1 to region 2, where the cloud desktop session can be hosted on at least one of the data centers 922A-922N at the new region.

It should be understood that although the descriptions describe a cloud desktop being migrated, any of the embodiments can also be applied to cloud-based services. For example, if it is determined that a cloud based service, such as a music streaming service or a database, would perform better if migrated to a new region, any of the described embodiments may be used to migrate the cloud-based service to a different region.

Example Computing Environment

Figure 10:
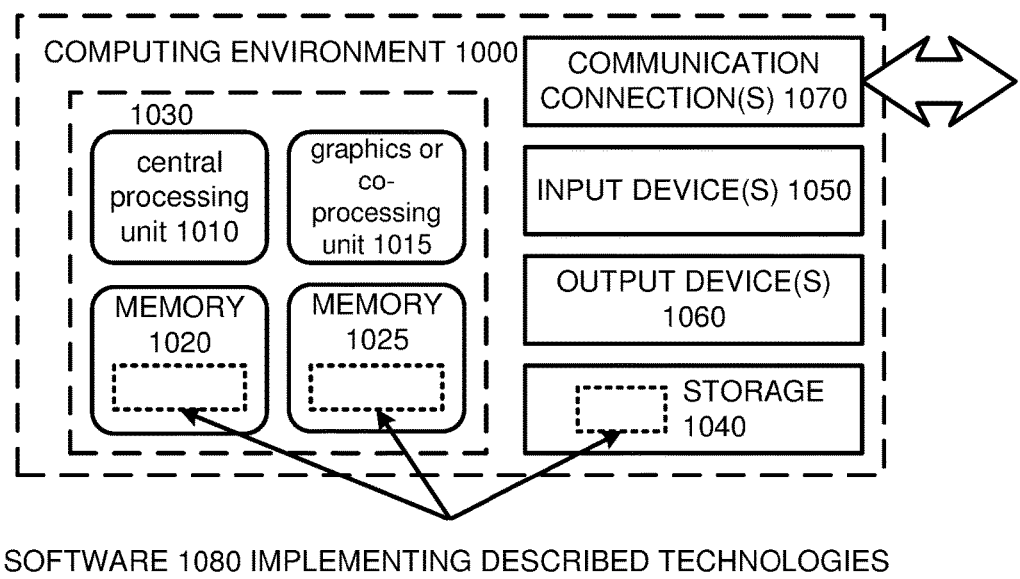
FIG. 10 depicts a generalized example of a suitable computing environment in which the described innovations may be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.)

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method for migrating a cloud desktop comprising:
   determining to migrate the cloud desktop from a current location based at least in part on network latency of a user computing device to the current location exceeding a latency threshold, wherein determining to migrate the cloud desktop comprises calculating the network latency of the user computing device to the current location;
   identifying a destination location to which to migrate the cloud desktop based at least in part on network latency of the user computing device to the destination location;
   copying a data volume of the cloud desktop from the current location to the destination location, the data volume comprising user data associated with a user of the cloud desktop;
   maintaining the data volume at the current location and the data volume at the destination location during the copying; and
   freezing a current user session associated with the cloud desktop at the current location;
   copying a current memory and processor state of the current user session to the destination location;
   starting a cloud desktop instance at the destination location using the copied data volume and current memory and processor state; and
   reconnecting the current user session to the cloud desktop instance at the destination location.

2. The method of claim 1, wherein the calculating comprises performing a ping operation, the ping operation determining a time signature of a packet sent by the user computing device to the current location.

3. The method of claim 1, wherein the determining comprises:
   identifying a current geographical location of the user computing device; and
   determining that the cloud desktop should be migrated based on the current geographical location of the user computing device relative to the current location.

4. The method of claim 3, wherein the current geographical location is identified by an IP address of the user computing device.

5. The method of claim 1, wherein the determining comprises:
   prompting one of a user and an administrator associated with the cloud desktop to migrate the cloud desktop; and
   receiving a selection from the one of a user and an administrator to migrate the cloud desktop to the destination location.

6. The method of claim 1, wherein the determining is automatically performed during the current user session without input from a user of the cloud desktop.

7. The method of claim 1, wherein the identifying comprises:
   identifying the destination location based at least on historical network latency data for a current geographical location of the user computing device.

8. The method of claim 1, wherein the identifying comprises:
   identifying one or more candidate locations; and
   based on latency of the user computing device to the one or more candidate locations, evaluating the one or more candidate locations to determine the destination location.

9. The method of claim 8, wherein the identifying one or more candidate locations comprises:
   identifying the one or more candidate locations based on a charge structure for the one or more candidate locations.

10. A computing system for migrating a virtual desktop, the computing system comprising:
a current location, the current location comprising a virtual desktop and a data volume, the data volume comprising user data associated with a user of the virtual desktop;
one or more candidate locations;
a management component configured to perform operations comprising:
determining to migrate a virtual desktop from the current location based at least in part on network latency of a user computing device to the current location exceeding a latency threshold, wherein determining to migrate the virtual desktop comprises calculating the network latency of the user computing device to the current location;
identifying one of the one or more candidate locations to which to migrate the virtual desktop as a destination location based at least in part on network latency of the user computing device to the destination location;
moving the data volume of the virtual desktop from the current location to the destination location;
copying a current memory and processor state of a current user session to the destination location; and
starting an instance of the virtual desktop at the destination location using the moved data volume and the copied current memory and processor state; and
a control plane layer, the control plane layer tracking the data volume of the virtual desktop and the one or more locations, the control plane layer configured to perform operations comprising:
directing the user connection request to the instance of the virtual desktop running at the destination location.

11. The computing system of claim 10, wherein the network latency of the user computing device to the destination location is less than the network latency of the user computing device to the current location.

12. The computing system of claim 10, wherein the management component is configured to perform further operations comprising:
shutting down an instance of the virtual desktop running at the current location.

13. The computing system of claim 10, wherein the management component is configured to perform further operations comprising:
maintaining a copy of the data volume at the current location and a copy of the data volume at the destination location in sync during the moving; and
upon completion of the moving:
freezing the current user session associated with the virtual desktop at the current location; and
reconnecting the current user session to the started instance of the virtual desktop at the destination location;
wherein copying the current memory and processor state and starting the instance at the destination location are performed upon completion of the moving.

14. A computer-readable storage medium storing instructions thereon for performing operations for migrating a cloud-based service, the operations comprising:
determining to migrate a cloud-based service from a current location based at least in part on network latency of a user computing device to the current location exceeding a latency threshold, wherein determining to migrate the cloud-based service comprises calculating the network latency of the user computing device to the current location;
identifying a destination location to which to migrate the cloud-based service based at least in part on network latency of the user computing device to the destination location;
copying a data volume of the cloud-based service from the current location to the destination location;
copying a current memory and processor state of a current user session associated with the cloud-based service to the destination location;
starting a cloud-based service instance using the data volume and the copied current memory and processor state at the destination location; and
connecting the current user session associated with the cloud-based service to the cloud-based service instance at the destination location.

15. The computer-readable storage medium of claim 14, wherein the operations further comprise:
maintaining a copy of the data volume at the current location and a copy of the data volume at the destination location in sync during the copying; and
upon completion of the copying:
freezing the current user session associated with the cloud-based service at the current location.

16. The computer-readable storage medium of claim 14, wherein the determining is automatically performed during the current user session associated with the cloud-based service without input from a user.

* * * * *